United States Patent Office 3,578,421
Patented May 11, 1971

3,578,421
LIQUID HYDROCARBON COMPOSITIONS CONTAINING REACTION PRODUCTS OF AN AMINE AND METHYL VINYL ETHER-MALEIC ANHYDRIDE COPOLYMERS AS ANTI-STATIC AGENTS
Harry J. Andress, Jr., Pitman, and Henry Ashjian, East Brunswick, N.J., assignors to Mobil Oil Corporation
No Drawing. Filed July 26, 1968, Ser. No. 747,808
Int. Cl. C10l 1/18, 1/22
U.S. Cl. 44—62                                         17 Claims

ABSTRACT OF THE DISCLOSURE

Liquid hydrocarbon compositions are provided containing, in an amount sufficient to impart anti-static properties, the reaction product of an amine and a methyl vinyl ether-maleic anhydride copolymer.

BACKGROUND OF THE INVENTION

(1) Field of the invention

This invention relates to organic liquids having desirable anti-static properties, and, in one of its aspects, relates more particularly to organic liquid compositions in the form of volatile organic liquids such as hydrocarbon fuels or solvents which possess low electrical conductivity which, when they accumulate electrostatic charges, may give rise to the hazards of ignition or explosion. Still more particularly in this aspect, the invention relates to the improvement of such organic liquids by incorporating therein, additives which are effective in increasing the electrical conductivity of such liquids to the extent that accumulation of electrostatic charges, with attendant danger of ignition or explosion, is significantly minimized, particularly in the handling, transportation or treatment of such liquids.

(2) Description of the prior art

Prior to the present invention, the low electrical conductivity of many volatile organic liquid compositions has presented the problem of controlling static buildup, particularly during handling and transportation, for the purpose of insuring safe and effective distribution without the concomitant danger of ignition or explosion. For example, volatile organic liquids such as hydrocarbon fuels (e.g. gasoline, jet fuels, turbine fuels and the like), or light hydrocarbon oils employed for such purposes as solvents or cleaning fluids for textiles, possess a very low degree of electrical conductivity. In the use of such fluids, electrostatic charges, which may be generated by handling, operation or other means, tend to form on the surface, and may result in sparks, thus resulting in ignition or explosion. These hazards may be encountered merely in the handling or transportation of such organic liquids and even in operations, such as centrifuging, in which a solid is separated from a volatile liquid, during which electrostatic charges can accumulate.

Various materials have heretofore been proposed for incorporation into such organic liquid compositions for increasing their electrical conductivity and thus reduce the aforementioned dangers of ignition and explosion. Such materials, however, have not been proved to be sufficiently effective in increasing the desired electrical conductivity of these fluids and, in many instances, have been found to be too costly for the relatively small degree of increased protection which they are capable of providing.

SUMMARY OF THE INVENTION

In accordance with the present invention, improved liquid hydrocarbon compositions are provided containing, in an amount sufficient to impart anti-static properties, the reaction product of an amine and a methyl vinyl ether-maleic anhydride copolymer. The incorporation of these anti-static agents in the liquid composition, imparts increased electrical conductivity to an extent greater than that which has heretofore been realized with many other anti-static materials.

In general, the present invention, in its preferred applications, contemplates organic liquid compositions which normally are capable of accumulating a relatively large degree of electrostatic charge resulting in the aforemention hazards of ignition and explosion, having incorporated therein a small amount of the aforementioned reaction product, usually from about 0.1 to about 200, and preferably from about 1 to about 10 pounds, per thousand barrels of the total volume of the liquid composition.

A field of specific applicability of the present invention is in the improvement of organic liquid compositions in the form of petroleum distillate fuel oils having an initial boiling point from about 75° F. to about 135° F. and an end boiling point from about 250° F. to about 1000° F. It should be noted, in this respect, that the term "distillate fuel oils" is not intended to be restricted to straight-run distillate fractions. These distillate fuel oils can be straight-run distillate fuel oils, catalytically or thermally cracked (including hydrocracked) distillate fuel oils, or mixtures of straight-run distillate fuel oils, naphthas and the like, with cracked distillate stocks. Moreover, such fuel oils can be treated in accordance with well-known commercial methods, such as acid or caustic treatment, hydrogenation, solvent refining, clay treatment, and the like.

The distillate fuel oils are characterized by their relatively low viscosity, pour point and the like. The principal property which characterizes these contemplated hydrocarbons, however, is their distillation range. As hereinbefore indicated, this range will lie between about 75° F. and about 1000° F. Obviously, the distillation range of each individual fuel oil will cover a narrower boiling range, falling nevertheless, within the above-specified limits. Likewise, each fuel oil will boil substantially, continuously, throughout its distillation range.

Particularly contemplated among the fuel oils are Nos. 1, 2 and 3 fuel oils, used in heating and as diesel fuel oils, gasoline, turbine fuels and the jet combustion fuels, as previously indicated. The domestic fuel oils generally conform to the specifications set forth in ASTM Specification D396–48T. Specifications for diesel fuels are defined in ASTM Specification D975–48T. Typical jet fuels are defined in Military Specification MIL-F-5624B.

The novel anti-static agents of the present invention may comprise the reaction product of any amine and the aforementioned methyl vinyl ether-maleic anhydride copolymer. Particularly preferred, and representative of such amines are: primary amines having a tertiary carbon atom attached to an amino group and continuing from about 12 to about 15 carbon atoms per amine molecule (often referred to in the literature as Primene 81R) or primary amines having a tertiary carbon atom attached to an amino group and containing from about 18 to about 24 carbon atoms per amine molecule (often referred to in the literature as Primene JMT); fatty amines, as exemplified by primary oleylamine, di-secondary cocoamine and tri-caprylyl amine; alkylaryl amines, as exemplified by phenylstearylamine; and complexed fatty acid fatty diamines, as exemplified by the condensation reaction product of 1 mol of oleyldiamine and 1 mol of a tall oil fatty acid. It will be understood, of course, that the reaction products of other amines and the aforementioned methyl vinyl ether-maleic anhydride copolymer may also be successfully incorporated into organic liquid compositions for their beneficial anti-static effect.

The aforementioned methyl vinyl ether-maleic anhydride copolymer is a commercially available material in which copolymerization between the methyl vinyl ether and the maleic anhydride is conducted in a mol ratio of from 1:1. This copolymer is described in the literature as having the following structure:

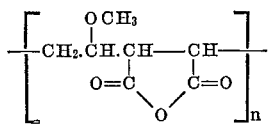

wherein $n$ is an integer greater than 1.

The literature further describes the following physical properties for the aforementioned copolymer.

Appearance: white, fluffy powder
Softening point range (° C.): 200–225
Specific gravity of film: 1.37
Bulk density of powder (lb./cu. ft.): 20
Angle of repose (degrees): 39
Residual free maleic anhydride: nil
pH 5% aqueous solution (free acid): approx. 2
Unit molecular weight (anhydride): 156
Unit molecular weight (free acid): 174

Insofar as the reaction between the amine and the copolymer are concerned, it is found that the reaction product can be produced by employing the amine and the copolymer in a mol ratio of from about 1:1 to about 2:1, as more fully hereinafter described.

DESCRIPTION OF SPECIFIC EMBODIMENTS

The following examples will serve to illustrate the preparation of the novel anti-static agents of the present invention, and the affect thereof when these agents are present in organic liquid compositions for the purpose of effectively imparting anti-static properties thereto, and particularly with respect to liquid hydrocarbon fuels.

Example 1

A mixture of 85 grams (0.4 mol) of [1] Primene 81R,

[1] A mixture of primary amines having a tertiary carbon atom attached to the amino (—NH₂) group, containing from about 12 to about 15 carbon atoms per amine molecule.

31.2 grams (0.2 mol) of the aforementioned methyl vinyl ether-maleic anhydride copolymer of low molecular weight, and 232 grams of xylene, as a diluent, was stirred at 140° C. for a period of three hours and resulted in a xylene solution of the aforementioned amine mixture-copolymer reaction product.

Example 2

A mixture of 125 grams (0.4 mol) of [2] Primene JMT, 31.2 grams (0.2 mol) of the aforementioned methyl vinyl ether-maleic anhydride copolymer, of the same molecular weight, as employed in Example 1, and 312 grams of xylene, as a diluent, was stirred at 140° C. for a period of about three hours and resulted in a xylene solution

[2] A mixture of primary amines having a tertiary carbon atom attached to the amino (—NH₂) group containing from about 18 to about 24 carbon atoms per amine molecule.

of the aforementioned amine mixture-copolymer reaction product.

Example 3

A mixture of 125 grams (0.4 mol) of Primene JMT, 31.2 grams (0.2 mol) of the aforementioned methyl vinyl ether-maleic anhydride copolymer of medium molecular weight, and 312 grams of xylene, as a diluent, was stirred at 140° C. for a period of about 3 hours and resulted in a xylene solution of the aforementioned amine mixture-copolymer reaction product.

Example 4

A mixture of 125 grams (0.4 mol) of Primene JMT, 31.2 grams (0.2 mol) of the aforementioned methyl vinyl ether-maleic anhydride copolymer of high molecular weight, and 312 grams of xylene, as a diluent, was stirred at 140° C. for a period of about three hours and resulted in a xylene solution of the aforementioned amine mixture-copolymer reaction product.

Example 5

A mixture of 123 grams (0.4 mol) of primary oleylamine, 31.2 grams (0.2 mol) of the aforementioned copolymer of Example 1 and 308 grams of xylene, as a diluent, was stirred at 115° C. for a period of about three hours and resulted in a xylene solution of the reaction product of the aforementioned primary oleylamine and the methyl vinyl ether-maleic anhydride copolymer.

Example 6

A mixture of 140 grams (0.4 mol) of phenylstearylamine, 31.2 grams (0.2 mol) of the aforementioned copolymer of Example 1 and 342 grams of xylene, as a diluent, was stirred at a temperature of from about 115° C. to about 120° C. for a period of about three hours and resulted in a xylene solution of the reaction product of the aforementioned phenylstearylamine and the methyl vinyl ether-maleic anhydride copolymer.

Example 7

A mixture of 160 grams (0.4 mol) of di-secondary cocoamine, 31.2 grams (0.2 mol) of the aforementioned copolymer of Example 1 and 382 grams of xylene, as a diluent, was stirred at 140° C. for a period of about two hours and resulted in a xylene solution of the reaction product of the aforementioned di-secondary cocoamine and the methyl vinyl ether-maleic anhydride copolymer.

Example 8

A mixture of 141 grams (0.4 mol) of tri-caprylyl amine, 31.2 grams (0.2 mol) of the aforementioned copolymer of Example 1 and 344 grams of xylene, as a diluent, was stirred at 108° C. for a period of four hours and resulted in a xylene solution of the reaction product of the aforementioned tri-caprylyl amine and the methyl vinyl ether-maleic anhydride copolymer.

Example 9

A mixture of 200 grams (0.26 mol) of the condensation product of 1 mol of oleyldiamine and 1 mol of a mixture of tall oil fatty acids, (condensed at 300° C.), 20 grams (0.13 mol) of the aforementioned copolymer of Example 1 and 220 grams of xylene, as a diluent, was stirred at 112° C. for a period of about four hours and resulted in a xylene solution of the reaction product of the aforementioned amine condensation product and the methyl vinyl ether-maleic anhydride copolymer.

In accordance with the data of the following table a series of comparative electrical conductivity tests were carried out for the purpose of determining the aforementioned properties of the compositions prepared in accordance with Examples 1 through 9 with respect to imparting anti-static properties to organic liquid compositions. The test employed for this purpose was electrical conductivity measured in picomhos (i.e. $10^{-12}$ mhos) per meter. In these tests the aforementioned anti-static agents were blended in a liquid hydrocarbon fuel composition comprising about 75% catalytically cracked component and about 25% straight-run component, boiling at a temperature from about 320–720° F. The resulting fuel compositions were then evaluated for their degree of improvement in electrical conductivity, with the results shown in the table.

TABLE

| Composition | Anti-static agent | Concentration, lbs./1,000 bbls. | Conductivity, picomhos/meter |
|---|---|---|---|
| Uninhibited fuel oil | | 0 | 9 |
| Do | Plus Example 1 | 5 | 399 |
| Do | Plus Example 2 | 5 | 388 |
| Do | Plus Example 3 | 5 | 551 |
| Do | Plus Example 4 | 5 | 532 |
| Do | Plus Example 5 | 5 | 248 |
| Do | Plus Example 6 | 5 | 252 |
| Do | Plus Example 7 | 5 | 88 |
| Do | Plus Example 8 | 5 | 86 |
| Do | Plus Example 9 | 5 | 139 |

As will be seen from the data of the examples of the foregoing table, a marked improvement in anti-static properties of organic liquid compositions is obtained through the use of the anti-static additive of the present invention. It will be understood, of course, that the improved organic liquid compositions of the present invention may, of so desired, contain various other additives or mixtures of such additional additives in order to further enhance their properties. Thus, the organic liquid compositions of the present invention may also contain such additives as antioxidants, detergents, dispersants, stability improvers and the like. It will also be understood that although the present invention has been described with preferred embodiments, various modifications and adaptations thereof may be resorted to without departing from the spirit and scope of the invention, as those skilled in the art will readily understand.

We claim:

1. A liquid hydrocarbon boiling in the distillate fuel range selected from the group consisting of gasoline, fuel oils and solvents, containing in an amount sufficient to impart anti-static properties, the reaction product of an amine and methyl vinyl ether-maleic anhydride copolymer, wherein the methyl vinyl ether and maleic anhydride are copolymerized in a mol ratio of 1:1, the anhydride having a unit molecular weight of 156, the free acid having a unit molecular weight of 174, and the amine and said copolymer are reacted in a mol ratio of from about 1:1 to about 2:1.

2. The composition of claim 1 wherein said reaction product is present in an amount from about 0.1 to about 200 pounds per thousand barrels of said composition.

3. The composition of claim 1 wherein said reaction product is present in an amount from about 1 to about 10 pounds per thousand barrels of said composition.

4. The composition of claim 1 wherein said amine comprises a primary amine having a tertiary carbon atom attached to an amino group and containing from about 12 to about 15 carbon atoms per amine molecule.

5. The composition of claim 1 wherein said amine comprises a primary amine having a tertiary carbon atom attached to an amino group and containing from about 18 to about 24 carbon atoms per amine molecule.

6. The composition of claim 1 wherein said amine comprises a fatty amine.

7. The composition of claim 6 wherein said amine comprises primary oleylamine.

8. The composition of claim 6 wherein said amine comprises di-secondary cocoamine.

9. The composition of claim 6 wherein said amine comprises tri-caprylyl amine.

10. The composition of claim 1 wherein said amine comprises an alkylaryl amine.

11. The composition of claim 10 wherein said amine comprises phenylstearylamine.

12. The composition of claim 1 wherein said amine comprises a complexed fatty acid fatty diamine.

13. The composition of claim 12 wherein said amine comprises the condensation product of 1 mol of oleyldiamine and 1 mol of a tall oil fatty acid.

14. The composition of claim 1 wherein said liquid hydrocarbon comprises a petroleum distillate fuel oil having an initial boiling point from about 75° F. to about 135° F. and an end boiling point from about 250° F. to about 1000° F.

15. The composition of claim 1 wherein said liquid hydrocarbon comprises a gasoline.

16. The composition of claim 1 wherein said liquid hydrocarbon comprises a jet fuel.

17. The composition of claim 1 wherein said liquid hydrocarbon comprises a turbine fuel.

References Cited

UNITED STATES PATENTS

| | | | |
|---|---|---|---|
| 3,010,810 | 11/1961 | Stayner et al. | 44—62 |
| 3,256,073 | 6/1966 | Hess | 44—62X |

DANIEL E. WYMAN, Primary Examiner

W. J. SHINE, Assistant Examiner

U.S. Cl. X.R.

44—63